(No Model.)
P. LONG.
CAR FENDER.
No. 551,217. Patented Dec. 10, 1895.
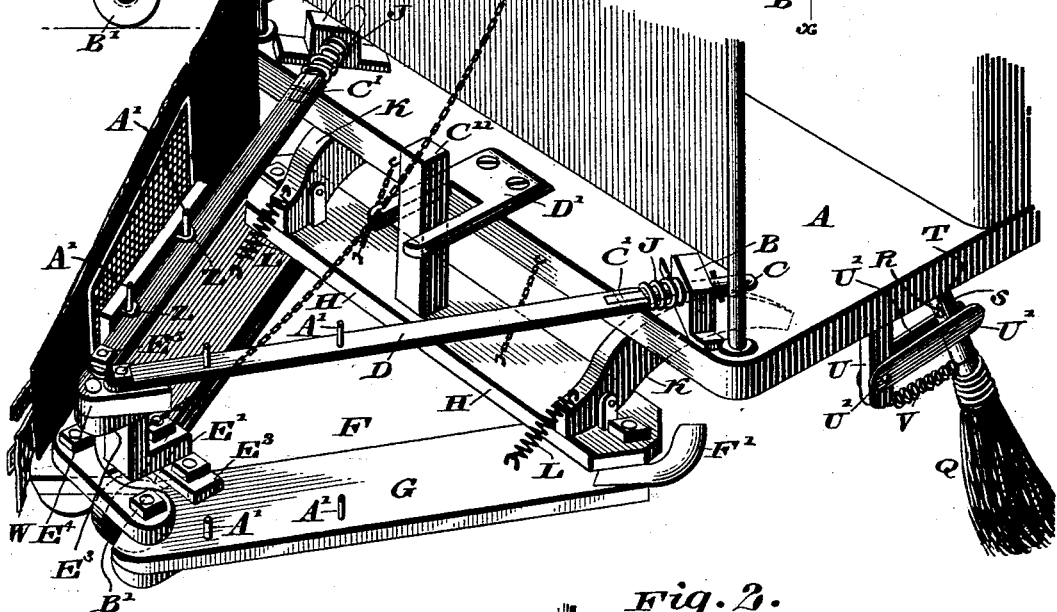
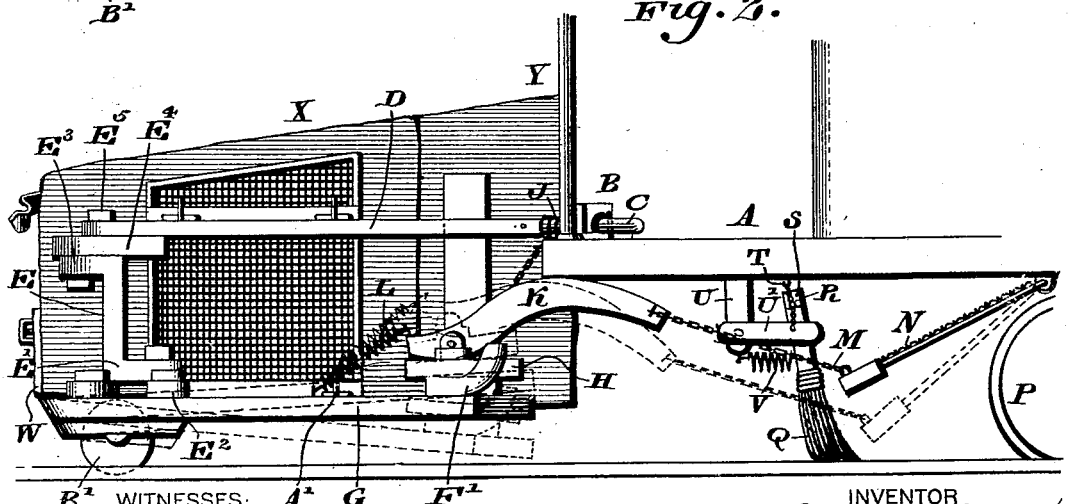
WITNESSES:
O. H. Naegle.
L. Douville.
INVENTOR
Patrick Long
BY
John H. Wiedersheim
ATTORNEY.

UNITED STATES PATENT OFFICE.

PATRICK LONG, OF PHILADELPHIA, PENNSYLVANIA.

CAR-FENDER.

SPECIFICATION forming part of Letters Patent No. 551,217, dated December 10, 1895.

Application filed July 18, 1895. Serial No. 556,319. (No model.)

*To all whom it may concern:*

Be it known that I, PATRICK LONG, a citizen of the United States, residing in the city and county of Philadelphia, State of Pennsylvania, have invented a new and useful Improvement in Car-Fenders, which improvement is fully set forth in the following specification and accompanying drawings.

My invention consists of a car-fender formed of a fender proper and an auxiliary fender, which latter is in front of the car-wheels and adapted to be lowered by the operation of the former, so as to prevent a person or object who may pass under the fender proper from being run over by said wheels, the novel features being hereinafter set forth, and pointed out in the claims that follow the specification.

Figure 1 represents a perspective view of a portion of a car-fender embodying my invention. Fig. 2 represents a side elevation of a portion thereof. Fig. 3 represents a front view thereof. Fig. 4 represents a vertical section of a portion on line $x\,x$, Fig. 3.

Similar letters of reference indicate corresponding parts in the several figures.

Referring to the drawings, A designates the platform of a car, and B designates ears on the front end thereof.

C designates rods which are freely passed through the ears B, and have connected with them by the hinges or hinged joints C' the forwardly-converging bars or arms D, whose front ends have connected with them the standard E, with which latter is connected the front end of the V-shaped fender F, whose frame is constructed of the side bars G and rear cross-bar H, which parts are bolted or otherwise secured together in any suitable manner, it being seen that owing to the hinges or hinged joints C the fender may be readily raised and lowered.

Springs J bear against the rods C, bars D, and ears B, so as to prevent injury to said parts when the fender is thrust rearward and to restore the same to its normal position.

Mounted on the cross-bar of the fender are swinging shoes K, whose axes are horizontal and whose front limbs have connected with them the springs L, which are attached to the adjacent portion of the fender and whose rear limbs bear against the under side of the platform A, the rear ends of said shoes having attached to them the chains M, which are connected with the supplemental fender N, which is mounted in front of the car-wheels P.

Depending from the sides of the platform above the rails of the car-track are brushes Q, which are vertically adjustable by means of the chains R, which are attached to the broom-heads S and have their links adapted to be attached to the hooks T on the platform of the car for vertical adjustment of the brushes, said heads being guided between the arms U', which are secured to the hanger U on the platform or floor A, said heads having connected with them the springs V for preventing strain on the brushes and returning the same to their normal positions.

W designates diverging flexible guards secured to the side pieces of the fender F and rising therefrom, the same being strapped or otherwise secured together in front and forming buffers for preventing injury to the person striking the fender.

X and Y designate vertical pads or cushions, which rise from the frame of the fender and extend above the buffers W, they being provided with eyes Z, which are fitted on upright pins A', rising from said frame, it being noticed that the cushions X and Y form in a measure continuities of each other and are connected by the flexible straps X', the cushions Y being located along the bars D and the cushions X being located at the corners of the platform and sides of the dasher, by which provisions the person when struck by the fender will not be injured by said bars, platform, and dasher.

At the forward end of the fender F is mounted the wheel or roller B', which when the fender is lowered or lowers is adapted to run on the road-bed.

Rising from the rear of the fender F is a post or standard C'', which passes freely through the slotted plate D' on the forward end of the platform A for guiding said fender in its rising and falling motions and preventing lateral strain thereon.

The standard E at the front of the fender, as shown in Figs. 1, 2, and 4, has a flange E' at bottom, the same being bolted to the cross-bar $E^2$, fixed to the side pieces G of the fender. On the top of said standard is a flange $E^3$, on which is mounted the horizontal swinging plate E⁴, to which the bars D are pivotally connected by the bolts E⁵, by which provision the fender F is connected with the bars D by a flexible joint, which permits a certain vertical and lateral play of said part without strain thereon or injury thereto.

The chains Aˣ, connected with the cross-bar H and the platform A, support the rear end of the fender.

Secured to the rear of the side pieces of the fender F are curved plates or shares F', which act as plows for removing snow from the car-rails.

It will be seen that when the fender F is struck the same may deflect the object or person laterally. Should the person fall, the fender, owing to its flexibility, may rise, and thus pass over the person or object. As the rear end of the fender rises, the front end of the shoes K follow the same, while the rear ends ride on the under side of the platform or floor A, and thus lower the chains M, whereby the auxiliary fender N is lowered, so that the person or object is taken up by the same and directed into the netting or bag thereof, so that he or it is removed from the car-wheels, and thus not liable to be run over.

The brushes Q serve to sweep the track, and also assist in pushing a person or object in front of the car-wheel, especially when such person or object falls beneath the car rearward of the car proper.

Having thus described my invention, what I claim as new, and desire to secure by Letters Patent, is—

1. In a car fender, converging arms pivotally attached to a platform, a standard to which the front ends of said arms are connected, a fender frame secured to said standard, a wheel journaled in the front end of said frame and chains connecting the rear end of said frame with said platform, said parts being combined substantially as described.

2. In a car fender, a frame having arms pivotally connected therewith, a wheel journaled in the front end of said frame and adapted to run on a road bed, and chains connected with the rear end of the frame, and supporting it above said road bed, said parts being combined substantially as described.

3. A fender, and arms, the latter being adapted to be connected with a car, in combination with a standard secured to the fender, and a swinging plate mounted on said standard, said arms being pivotally connected with said plate substantially as described.

4. An upwardly swinging fender, a shoe pivotally mounted on said fender and having its heel lowered when the fender is raised, and an auxiliary fender connected by a chain with said heel and adapted to be lowered when the said heel is depressed, said parts being combined substantially as described.

5. A front fender and an auxiliary fender rearward thereof, in combination with a shoe which is mounted on the front fender, a spring connected with the latter and said shoe, and a connection for said shoe and auxiliary fender, substantially as described.

6. A fender, in combination with the arms D connected therewith, the rod C mounted on the car, in the ears B thereon, and the springs J bearing outwardly against said arms, said rods and arms being connected by hinged joints, substantially as described.

7. In a car fender, converging arms hinged to attachments on a car platform, a standard to which the front ends of said arms are pivotally connected, a fender frame secured to said standard and having a rear cross bar with a standard thereon, chains connected with said platform and supporting the rear end of said frame, and a slotted plate connected with said platform and forming a guide for said latter mentioned standard, said parts being combined substantially as described.

8. In a car fender, the ears B, the rods C freely passing through said ears and arms D hinged to said rods, the springs J bearing against said arms and ears, the fender frame F secured to said arms, the wheel B' journaled in said frame and supporting the front end thereof and chains Aˣ connected with a car platform and supporting the rear end of said frame, said parts being combined substantially as described.

9. A fender having the vertical cushions X, Y, mounted thereon, the same being connected at their ends by the elastic straps X', substantially as described.

10. A car fender in combination with a brush which is adjustably supported by means of the chain and hook, as described and having its head freely fitted between guides on a hanger of a car, substantially as described.

PATRICK LONG.

Witnesses:
JOHN H. WIEDERSHEIM,
WM. A. WIEDERSHEIM.